United States Patent
Plestid et al.

(10) Patent No.: US 7,684,791 B2
(45) Date of Patent: Mar. 23, 2010

(54) MULTIPLE KEYBOARD CONTEXT SENSITIVITY FOR APPLICATION USAGE

(75) Inventors: Trevor Plestid, Ottawa (CA); Arun Munje, Ottawa (CA)

(73) Assignee: Research In Motion Limited, Waterloo (CA)

( * ) Notice: Subject to any disclaimer, the term of this patent is extended or adjusted under 35 U.S.C. 154(b) by 406 days.

(21) Appl. No.: 11/150,168

(22) Filed: Jun. 13, 2005

(65) Prior Publication Data
US 2006/0281448 A1    Dec. 14, 2006

(51) Int. Cl.
*H04M 3/00*    (2006.01)
(52) U.S. Cl. ...................................... 455/418
(58) Field of Classification Search ............. 455/550.1, 455/566, 564, 90.3, 556.1, 456.1, 575, 560, 455/445, 418, 575.1, 575.6, 575.7, 186.2, 455/95
See application file for complete search history.

(56) References Cited

U.S. PATENT DOCUMENTS

| | | | |
|---|---|---|---|
| 6,055,439 A | 4/2000 | Helin et al. | |
| 6,591,117 B1 * | 7/2003 | Kim | 455/566 |
| 6,952,200 B2 * | 10/2005 | Sirola et al. | 345/168 |
| 7,092,511 B1 * | 8/2006 | Kusaka et al. | 379/355.09 |
| 2003/0227745 A1 | 12/2003 | Khoo | |
| 2004/0127267 A1 | 7/2004 | Wong et al. | |
| 2006/0178164 A1 * | 8/2006 | Eichenbaum | 455/550.1 |
| 2006/0214916 A1 * | 9/2006 | Mulford | 345/169 |
| 2009/0031284 A1 * | 1/2009 | Shenfield et al. | 717/114 |

FOREIGN PATENT DOCUMENTS

| | | |
|---|---|---|
| EP | 1207672 A | 5/2002 |
| WO | WO03073258 A | 9/2003 |

OTHER PUBLICATIONS

European Search Report from EP05105167, dated Nov. 23, 2005.

* cited by examiner

*Primary Examiner*—Melody Mehrpour
(74) *Attorney, Agent, or Firm*—Moffat & Co.

(57) ABSTRACT

A method and improved mobile device for providing context sensitivity for application usage in a mobile device having multiple keyboards, the method comprising the steps of: receiving a keystroke at the mobile device; checking a state the mobile device is in; comparing the state the mobile device is in with a state an application expects; if the comparing step determines the state the mobile device is in differs from the state an application expects, and mapping the keystroke from the state the mobile device is in to a keystroke in the state the application expects.

17 Claims, 4 Drawing Sheets

MULTIPLE KEYBOARD CONTEXT SENSITIVITY FOR APPLICATION USAGE

FIELD OF THE APPLICATION

The present application relates to hand-held mobile devices and in particular to hand-held mobile devices having two or more independent keyboards.

BACKGROUND

Typical mobile devices have in the past included a single keyboard or keypad that allows the user to interact with the mobile device. However, as mobile device technology has evolved, mobile devices have been used for an expanding number of applications. A mobile device such as the cellular telephone or pager may now also be used as a data device, allowing emails to be sent or received, short messages to be sent or received, or even browsing the Internet, among other features.

In order to accommodate various applications, mobile devices in some cases utilize hidden or alternative keyboards. Examples include the Nokia 6810™ messaging device which includes a standard T9 keypad when the device is in a closed configuration and a full keyboard surrounding a display screen when the device is in an open configuration.

Similarly, the Siemens SK65™ mobile phone has a standard T9 keypad when in a closed configuration and a full keypad that can be rotated from behind the standard keyboard to reveal both the full keyboard and the T9 pad at the same time when in an open configuration. Another device is the Sony P910™, which includes a T9 keypad which can flip down to reveal a full keyboard.

The above devices and other devices similar to them allow a user to enter various applications from the T9 keypad but typically do not allow any functionality such as text input or navigation without using the alternative keypad. This is problematic when the user is more comfortable with one keypad over another, when a user wishes to use only one hand to enter information, or in similar situation in which it is preferable to use one keypad over another.

BRIEF DESCRIPTION OF THE DRAWINGS

The present application will be best understood with reference to the drawings in which.

DETAILED DESCRIPTION

The present method and apparatus provide for complete control of applications on a mobile device from any of the keypads provided on the mobile device. For example, in one embodiment a user could use a typical T9 keyboard for a primarily QWERTY application, although DVORAK or QUERTZ applications can equally be used. This would allow users who are quick at performing typed commands using a typical T9 keyboard to use this keyboard rather than the other keyboard built into the mobile device.

The mobile device in the present application typically includes two modes, labelled herein as a standby mode and a working mode. The present application allows the entry of data regardless of the mode the device is in.

While there should be no restrictions placed on the means of text entry in the above case, various modifications are also envisioned. Navigation using the first keyboard could be achieved by allowing certain keys to become scroll buttons or allowing the key to be used to navigate through various menus based on letters represented by that key.

The apparatus could have means to recognize that the user is navigating through an application using the alternative keypad and these means could include assigning various keys to various functionality.

The present application therefore provides a method for providing context sensitivity for application usage in a mobile device having multiple keyboards, the method comprising the steps of: receiving a keystroke at the mobile device; checking a state the mobile device is in; comparing the state the mobile device is in with a state an application expects; and if the comparing step determines the state the mobile device is in differs from the state an application expects, mapping the keystroke from the state the mobile device is in to a keystroke in the state the application expects.

The present application further provides an improved mobile device having a microprocessor running applications, communication means controlled by the microprocessor, speaker for audio output from the mobile device, microphone for audio input to the mobile device, at least two keypads, batteries for providing power to the mobile device, a display for displaying output from the microprocessor, and memory, the improvement comprising: a comparing means to compare a state the mobile device is in with a state a presently running application expects; and a mapping means to map a keystroke from one of the at least two keypads with a keystroke in the state the presently running application expects if the comparing means finds the mobile device is in a different state than the state the application expects.

Reference is now made to the drawings.

Figure 1:
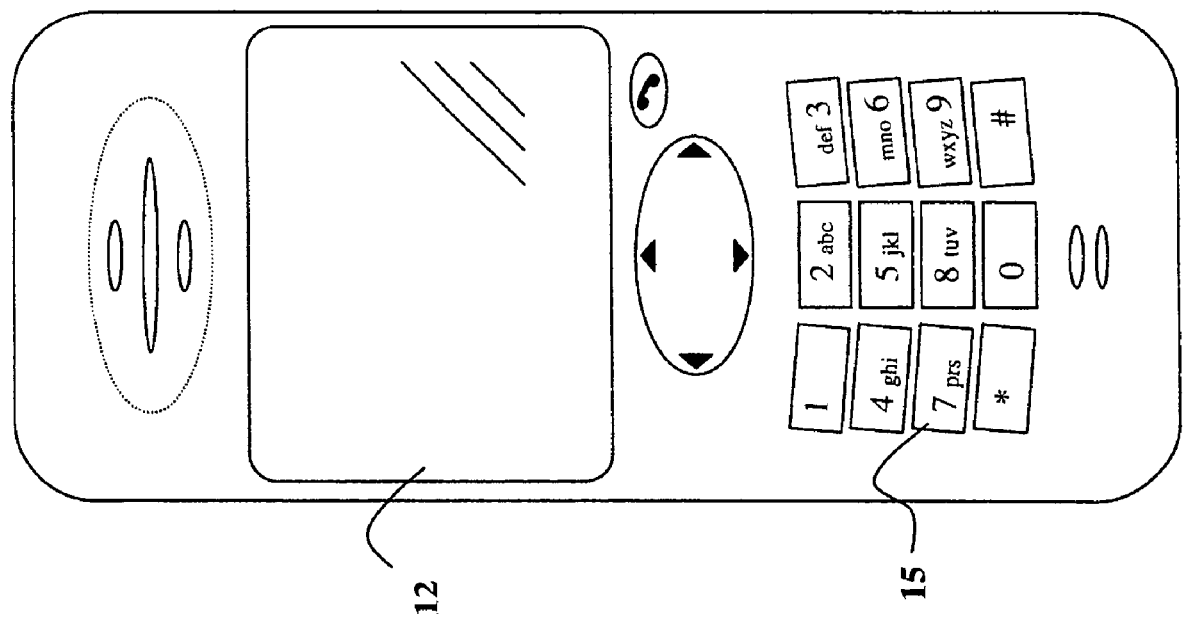
FIG. 1 is a mobile device in a first configuration showing a first text input means.
Figure 2:
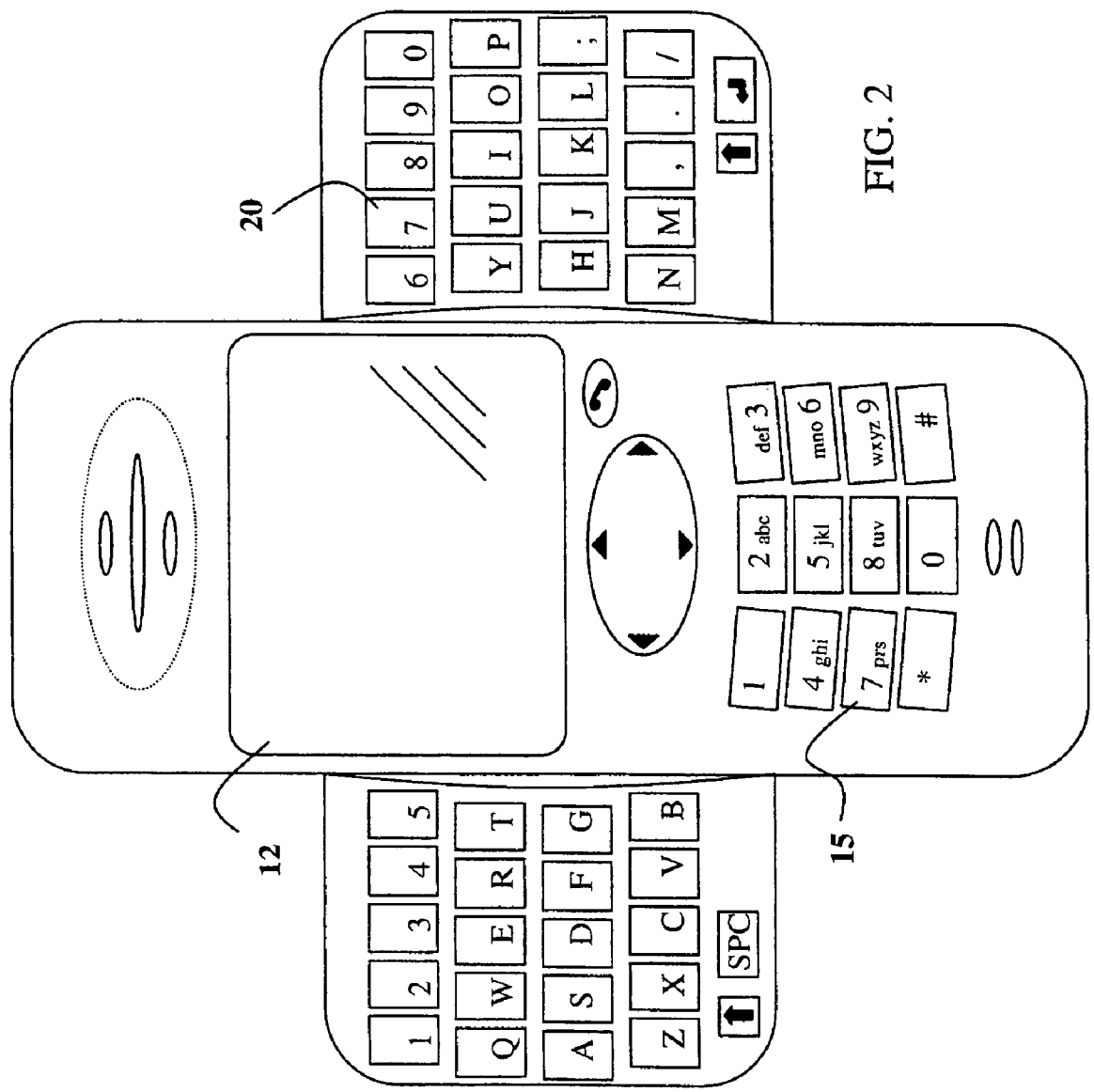
FIG. 2 is the mobile device of FIG. 1 in a second configuration showing a second text input means.

A mobile device as illustrated in FIGS. 1 and 2 will be described herein as having two different modes. A first mode is described as a "standby mode" and is used for designated applications in general, and a second mode which is referred to herein as a "working mode" that is typically used in various applications that are different from those applications in standby mode. For example, in the illustration of FIG. 1, the mobile device includes a display 12 and T9 keyboard 15. The T9 keyboard is a typical keyboard layout for a telephone and includes four rows of three keys and in the example of FIG. 1 these keys are labelled 1-3 in the first row, 4-6 in the second row, 7-9 in the third row and *,0, # in the bottom row.

As will be appreciated by those skilled in the art, each key can have various letters associated therewith. For example, the number 2 can have the letters "ABC" associated with this number.

In the "standby" mode of FIG. 1, a typical application could include a cellular telephone call. In this application, a user can enter the number to be dialled with the keypad and press a send key in order to complete the call. Other applications could include an SMS messaging, camera phone operation, or other applications known to those skilled in the art. The above is not meant to be limiting to typical applications that can be used in standby mode, and other applications are known.

In the "working" mode of FIG. 2, a second keyboard can be exposed. This second keyboard could, for example, include a full QWERTY keyboard to allow the user to type messages having the full keyboard available to them. As described above, the second keyboard could be exposed through various means including a panel being rotated from behind the phone, as shown in FIG. 2, a flip open keyboard, a slide open keyboard, or other keyboards that are known to those in the art.

In one example, the working mode of FIG. 2 could be used to interact within an email application in order to send and receive email messages. A user could type out an email message using the keyboard 20 and then send it.

Devices with a first keypad 15 and a second keypad 20 have in the past required that the user use a specific keypad to interact with a specific application. Thus, if the user wishes to make a cellular phone call in the above examples, the user would be required to use keypad 15 while if the user wanted to interact with an email program, the user would need to interact using keypad 20. However, in certain cases, it would be desirable to be able to use keypad 15 for applications that are typically written for keypad 20. For example, if the user has only one hand free, then the user may wish to interact with the email program using that free hand as opposed to being required to open the keypad and entering keystrokes using second keypad 20. In other cases, the user may be more comfortable using a keypad that they are more familiar with. For example, if somebody has used a mobile device that only has a single keypad 15, the user might be more comfortable continuing to only use this keypad. By giving users the option of using either keypad 15 or keypad 20 for any application, this enhances the user's experience.

Figure 3:
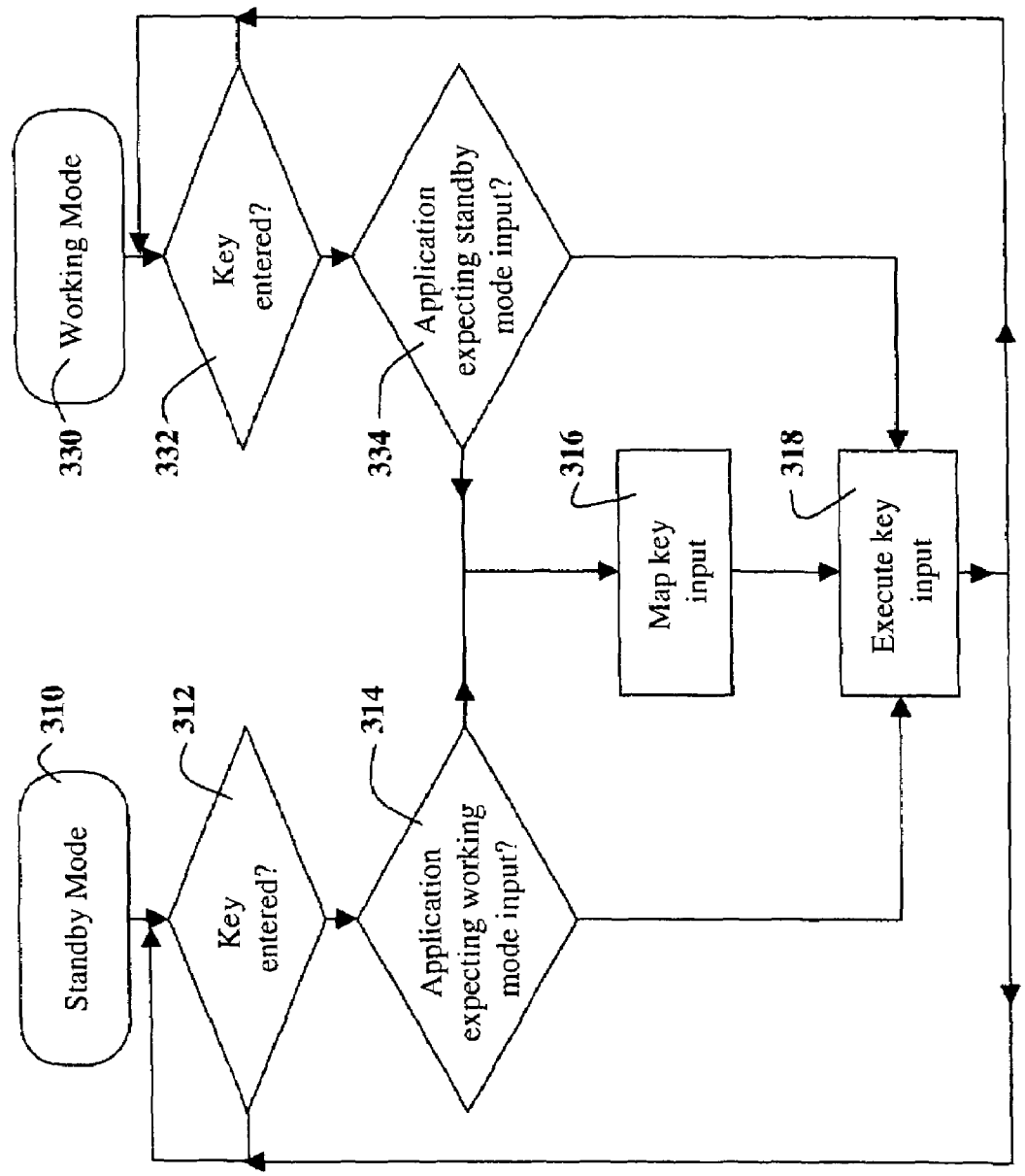
FIG. 3 shows a flow chart showing the mapping of keys entered when the mobile device is in various states.

FIG. 3 shows an exemplary method for a device to implement mapping between keys inputted on multiple keyboards. FIG. 3 is however not meant to limit the scope of the present application.

As seen in FIG. 3, the device can be either in a standby mode or a working mode. As is described in more detail below, the standby mode or working mode can be determined by the state of the keyboards, the location the key input comes from, or a variable within the mobile device.

If the mobile device is in standby mode 310, the mobile station may be waiting for a key to be entered in a step 312. Step 312 is illustrated as a continuous loop in which the mobile station stays in state 312 until a key is entered. However, one skilled in the art would realize that in practice a key entry could instead cause an interrupt and thus the depiction of step 312 is merely for illustrative purposes.

Once a key is entered the mobile station proceeds to step 314 in which it determines whether the application that is currently in the foreground on the mobile device was expecting a key input from the working mode keypad or from the standby mode keypad. For example, this could be the case where a mobile device is in an e-mail program and receives an input from a T9 keyboard. In the present case, if it is determined in step 314 that the application is expecting a working mode input when in standby mode the mobile device proceeds to step 316 in which it attempts to map the input with an input the application can recognize. Step 316 is described in more detail below.

Conversely, if the application is in standby mode and receives a standby mode input it proceeds directly to step 318 in which the key input is executed and the mobile device then proceeds back to step 312 in which it waits for a key to be entered.

Similarly, if the mobile device is in a working mode 330 it may wait for a key to be entered in step 332. As with the above, the key entry could be a loop, or it more likely will be an interrupt.

Once a key is entered, the mobile device proceeds to step 334 in which it checks to see whether the application was expecting a standby mode input. For example, if the mobile device is in a telephone application it may be expecting keypad entries from a T9 keyboard, which would in this case be the standby mode keypad. However, if an input is received from the QWERTY keyboard this might be an unexpected event which in the prior art would be ignored. For example, if a vendor lists their number as 1-800-CALLSME, a user could use the T9 keypad to dial the 1-800 portion and the QWERTY keypad to type CALLSME. The input from the QWERTY keypad would be unexpected in this situation, and step 316 would need to map each letter with an appropriate number, as described below in general.

If the application is expecting a standby mode input and receives a working mode key entry, the mobile device proceeds to step 316 in which the key is mapped and then to step 318 in which the input is executed Conversely, if the application receives the key input that it is expecting, it executes the key input in step 318 directly and proceeds back to step 332 in which the mobile device waits for a key entry.

Step 316 can be used to map one keypad to another. For example, when in a navigation mode in an e-mail program, a user may have the option of executing various navigation steps using short cut keys. One such short cut key could be the use of the letter "D" in order to jump to a delete menu item. If this e-mail program receives an input from the T9 keypad of the numeral "3", the map key input step 316 could determine that the letter 3 has the letters "DEF", and based on this it should jump to the first quick mapping which is the letter D. Subsequent depressing of the 3 key on the T9 keypad could prompt the menu item to jump to further menu items starting with "D" or to menu items starting with "E" or "F".

Similarly, map key input step 316 could be used to implement specific keys on the keypad for performing various functions. For example, if in an e-mail message list, the numbers 2 and 8 could indicate page up and page down, 3 and 9 could indicate move to the top or the bottom and 1 and 7 could move to the previous day or the next day. Other mappings could also be associated with the T9 keypad. Thus, the present method and system allow for expanded functionality by adding functionality to a specific keypad.

Map key input step 316 could further be used in order to input text. For example, in an e-mail program if the user is typing a message, the user could use the T9 keypad to input letters. Letters are associated with each key and typing using a T9 keypad, for example for SMS messages is known. Other alternatives include implementing a "sure type" completion of words. Thus if a user has entered various letters prior to the current letter being entered, the mobile station may recognize that only certain letters logically would appear after those first letters typed and thus might simplify key entry.

As indicated above, step 316 could also be used to convert letters from a QWERTY keypad entry into numbers in order to type in a telephone number the vendor has described using letters.

One skilled in the art will realize that the state based modes in the above example FIG. 3 can be determined in various ways. For example, if the mobile device exposes one keypad to the exclusion of the other keypad, the mode can be determined by which keypad is exposed. Conversely, the mode could be switched based on the location of the key input or it could be switched using a software key within the mobile device itself.

One skilled in the art would also realize that various other enhancements could be made to the mobile device in order to accommodate the alternate key entries. For example, user interface enhancements could be made in one mode. If in a data mode but using the T9 keypad, the user interface could be used to prompt the user or show options to the user for use of the T9 keypad.

If more than two keyboards are used, it may be desirable to have more than two states the mobile device can be in. In that case, FIG. 3 can be modified to include further states in which a keystroke is waited for and a check to see which state the application expects is made. If the states do not match, then mapping step 316 can be used, and otherwise step 318 can be used for each of the additional states.

The above is not meant to be limited to the use of a QWERTY keypad or a T9 keypad, and could be used in any mobile device in which at least two independent keypads are available. In one embodiment, a virtual keypad could replace a physical keypad or could be used in conjunction with two or more keypads. A virtual keypad could include a touch sensitive screen, or could be broad enough to include voice recognition software in combination with a microphone. The virtual keypad could in this case be inter-worked with a full keypad to provide functionality to the mobile device.

One skilled in the art will further realize that map key input step 316 could be implemented as a mapping table, which converts one input to another based on the application. Each application could therefore provide specific mappings for specific keys on a mobile device or alternatively use a generic mapping which could be provided for all applications. Other mapping techniques are also considered to be part of the present application.

Figure 4:
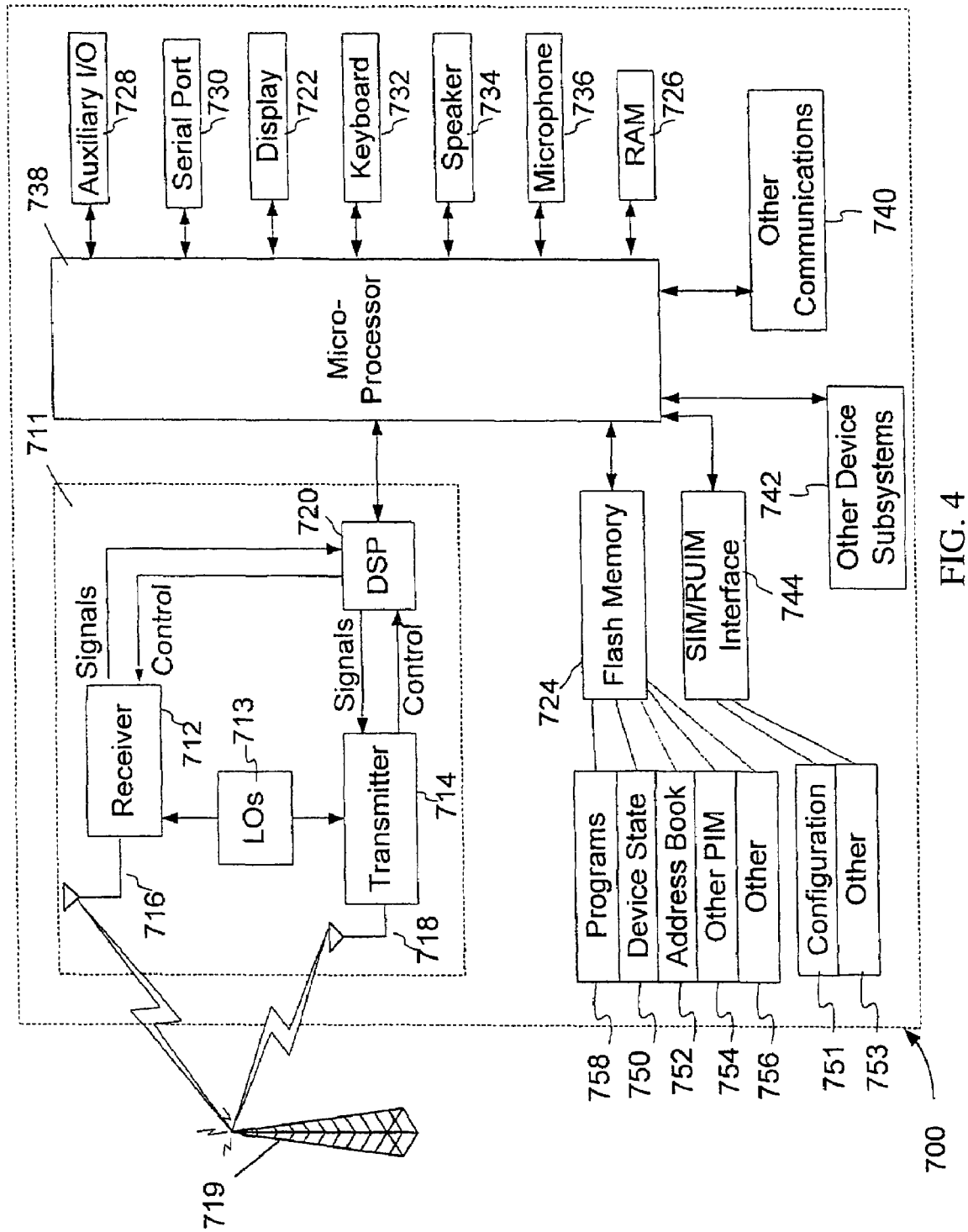
FIG. 4 shows a block diagram of an exemplary mobile device that could be used with the present application.

Reference is now made to FIG. 4. FIG. 4 is a block diagram illustrating a mobile station apt to be used with preferred embodiments of the apparatus and method of the present application. Mobile station 700 is preferably a two-way wireless communication device having at least voice and data communication capabilities. Mobile station 700 preferably has the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where mobile station 700 is enabled for two-way communication, it will incorporate a communication subsystem 711, including both a receiver 712 and a transmitter 714, as well as associated components such as one or more, preferably embedded or internal, antenna elements 716 and 718, local oscillators (LOs) 713, and a processing module such as a digital signal processor (DSP) 720. As will be apparent to those skilled in the field of communications, the particular design of the communication subsystem 711 will be dependent upon the communication network in which the device is intended to operate. For example, mobile station 700 may include a communication subsystem 711 designed to operate within the Mobitex™ mobile communication system, the DataTAC™ mobile communication system, GPRS network, UMTS network, EDGE network or CDMA network.

Network access requirements will also vary depending upon the type of network 719. For example, in the Mobitex and DataTAC networks, mobile station 700 is registered on the network using a unique identification number associated with each mobile station. In UMTS and GPRS networks, and in some CDMA networks, however, network access is associated with a subscriber or user of mobile station 700. A GPRS mobile station therefore requires a subscriber identity module (SIM) card in order to operate on a GPRS network, and a RUIM in order to operate on some CDMA networks. Without a valid SIM/RUIM card, a GPRS/UMTS/CDMA mobile station may not be fully functional. Local or non-network communication functions, as well as legally required functions (if any) such as "911" emergency calling, may be available, but mobile station 700 will be unable to carry out any other functions involving communications over the network 700. The SIM/RUIM interface 744 is normally similar to a card-slot into which a SIM/RUIM card can be inserted and ejected like a diskette or PCMCIA card. The SIM/RUIM card can have approximately 64K of memory and hold many key configuration 751, and other information 753 such as identification, and subscriber related information.

When required network registration or activation procedures have been completed, mobile station 700 may send and receive communication signals over the network 719. Signals received by antenna 716 through communication network 719 are input to receiver 712, which may perform such common receiver functions as signal amplification, frequency down conversion, filtering, channel selection and the like, and in the example system shown in FIG. 4, analog to digital (A/D) conversion. A/D conversion of a received signal allows more complex communication functions such as demodulation and decoding to be performed in the DSP 720. In a similar manner, signals to be transmitted are processed, including modulation and encoding for example, by DSP 720 and input to transmitter 714 for digital to analog conversion, frequency up conversion, filtering, amplification and transmission over the communication network 719 via antenna 718. DSP 720 not only processes communication signals, but also provides for receiver and transmitter control. For example, the gains applied to communication signals in receiver 712 and transmitter 714 may be adaptively controlled through automatic gain control algorithms implemented in DSP 720.

Mobile station 700 preferably includes a microprocessor 738 which controls the overall operation of the device. Communication functions, including at least data and voice communications, are performed through communication subsystem 711. Microprocessor 738 also interacts with further device subsystems such as the display 722, flash memory 724, random access memory (RAM) 726, auxiliary input/output (I/O) subsystems 728, serial port 730, two or more keyboards or keypads 732, speaker 734, microphone 736, other communication subsystem 740 such as a short-range communications subsystem and any other device subsystems generally designated as 742.

Some of the subsystems shown in FIG. 4 perform communication-related functions, whereas other subsystems may provide "resident" or on-device functions. Notably, some subsystems, such as keyboards/keypads 732 and display 722, for example, may be used for both communication-related functions, such as entering a text message for transmission over a communication network, and device-resident functions such as a calculator or task list.

Operating system software used by the microprocessor 738 is preferably stored in a persistent store such as flash memory 724, which may instead be a read-only memory (ROM) or similar storage element (not shown). Those skilled in the art will appreciate that the operating system, specific device applications, or parts thereof, may be temporarily loaded into a volatile memory such as RAM 726. Received communication signals may also be stored in RAM 726.

As shown, flash memory 724 can be segregated into different areas for both computer programs 758 and program data storage 750, 752, 754 and 756. These different storage types indicate that each program can allocate a portion of flash memory 724 for their own data storage requirements. Microprocessor 738, in addition to its operating system functions, preferably enables execution of software applications on the mobile station. A predetermined set of applications that control basic operations, including at least data and voice communication applications for example, will normally be installed on mobile station 700 during manufacturing. A preferred software application may be a personal information manager (PIM) application having the ability to organize and manage data items relating to the user of the mobile station such as, but not limited to, e-mail, calendar events, voice mails, appointments, and task items. Naturally, one or more memory stores would be available on the mobile station to facilitate storage of PIM data items. Such PIM application would preferably have the ability to send and receive data items, via the wireless network 719. In a preferred embodiment, the PIM data items are seamlessly integrated, synchronized and updated, via the wireless network 719, with the mobile station user's corresponding data items stored or associated with a host computer system. Further applications may also be loaded onto the mobile station 700 through the network 719, an auxiliary I/O subsystem 728, serial port 730, short-range communications subsystem 740 or any other suitable subsystem 742, and installed by a user in the RAM 726 or preferably a non-volatile store (not shown) for execution by the microprocessor 738. Such flexibility in application installation increases the functionality of the device and may provide enhanced on-device functions, communication-related functions, or both. For example, secure communication applications may enable electronic commerce functions and other such financial transactions to be performed using the mobile station 700.

In a data communication mode, a received signal such as a text message or web page download will be processed by the communication subsystem 711 and input to the microprocessor 738, which preferably further processes the received signal for output to the display 722, or alternatively to an auxiliary I/O device 728. A user of mobile station 700 may also compose data items such as email messages for example, using the keyboard 732, which is preferably a complete alphanumeric keyboard or telephone-type keypad, in conjunction with the display 722 and possibly an auxiliary I/O device 728. Such composed items may then be transmitted over a communication network through the communication subsystem 711.

For voice communications, overall operation of mobile station 700 is similar, except that received signals would preferably be output to a speaker 734 and signals for transmission would be generated by a microphone 736. Alternative voice or audio I/O subsystems, such as a voice message recording subsystem, may also be implemented on mobile station 700. Although voice or audio signal output is preferably accomplished primarily through the speaker 734, display 722 may also be used to provide an indication of the identity of a calling party, the duration of a voice call, or other voice call related information for example.

Serial port 730 in FIG. 4, would normally be implemented in a personal digital assistant (PDA)-type mobile station for which synchronization with a user's desktop computer (not shown) may be desirable, but is an optional device component. Such a port 730 would enable a user to set preferences through an external device or software application and would extend the capabilities of mobile station 700 by providing for information or software downloads to mobile station 700 other than through a wireless communication network. The alternate download path may for example be used to load an encryption key onto the device through a direct and thus reliable and trusted connection to thereby enable secure device communication.

Other communications subsystems 740, such as a short-range communications subsystem, is a further optional component which may provide for communication between mobile station 700 and different systems or devices, which need not necessarily be similar devices. For example, the subsystem 740 may include an infrared device and associated circuits and components or a Bluetooth™ communication module to provide for communication with similarly enabled systems and devices.

It is envisaged that, in addition to resetting the inactivity timer, a solicitation message optionally causes any Dynamic Host Configuration Protocol (DHCP) leases associated with the IP address of the wireless device to be renewed. This can be accomplished by adapting the data node which receives solicitation messages, such as a PDSN, to send a renew lease message to the DHCP server that configured the IP address, the renew lease message being sent upon reception of a solicitation message at the PDSN.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

We claim:

1. A method for providing context sensitivity for application usage in a mobile device having multiple concurrently operable independent keyboards, the method comprising the steps of:
   a) assigning one or more states to the mobile device, each state of the device corresponding to a keyboard to be utilised;
   b) designating one or more applications to a state, the state of the application determining from which of said key boards a key stroke is expected;
   c) receiving a keystroke at the mobile device from any one of the multiple concurrently operable keyboards;
   d) checking a state of the mobile device based on the received keystroke;
   e) checking a state of a presently running application;
   f) comparing the state of the mobile device with the state of a presently running application; and
   g) mapping the received keystroke to a keystroke the presently running application expects if the comparing step determines the state of the mobile device differs from the state of the presently running application.

2. The method of claim 1, wherein the multiple keyboards include a T9 keyboard and an alphanumeric keyboard.

3. The method of claim 2, wherein the alphanumeric keyboard is selected from the group consisting of a QWERTY keyboard, a DVORAK keyboard and a QWERTZ keyboard.

4. The method of claim 2, wherein the state the mobile device is in corresponds with which keyboard is being used.

5. The method of claim 1, wherein the receiving step corresponds with one of a data entry mode and a navigation mode.

6. The method of claim 2, wherein the mapping step maps navigational menus to keys on the T9 keyboard based on letters associated with the keys.

7. The method of claim 2, wherein the mapping step maps navigational functions to keys on the T9 keyboard based on the location of the keys.

8. The method of claim 1, wherein at least one of the multiple keyboards is a virtual keyboard.

9. The method of claim 8, wherein the virtual keyboard is a voice recognition program and a microphone.

10. An improved mobile device having a microprocessor running applications, communication means controlled by the microprocessor, speaker for audio output from the mobile device, microphone for audio input to the mobile device, at least two active concurrently operable keyboards, batteries for providing power to the mobile device, a display for displaying output from the microprocessor, and memory, the improvement comprising:
   a) a comparing means to compare a state the mobile device is in with a state a presently running application expects; and
   b) a mapping means to map a keystroke from one of the at least two concurrently operable keyboards with a keystroke in the state the presently running application expects if the comparing means finds the mobile device is in a different state than the state the application expects.

11. The improved mobile device of claim 10, wherein the multiple keyboards include a T9 keyboard and an alphanumeric keyboard.

12. The improved mobile device of claim 11, wherein the alphanumeric keyboard is selected from the group consisting of a QWERTY keyboard, a DVORAK keyboard and a QWERTZ keyboard.

13. The improved mobile device of claim 11, wherein the state the mobile device is in corresponds with which keyboard the keystroke came from.

14. The improved mobile device of claim 11 wherein the mapping means includes means to map navigational menus to keys on the T9 keyboard based on letters associated with the keys.

15. The improved mobile device of claim 11 wherein the mapping means includes means to map navigational functions to keys on the T9 keypad based on the location of the keys.

16. The method of claim 10, wherein at least one of the multiple keyboards is a virtual keyboard.

17. The method of claim 16, wherein the virtual keyboard is a voice recognition program and a microphone.

* * * * *